Nov. 11, 1924.
W. STEWART
CONDIMENT HOLDER
Filed Aug. 25, 1922
1,514,740
Fig. 1.
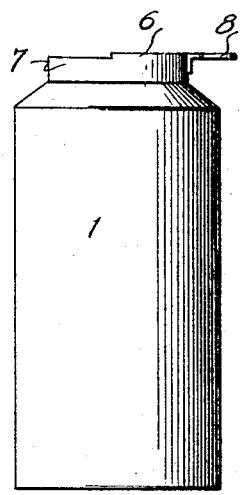
Fig. 5.
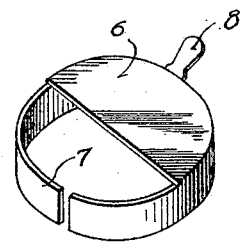
Fig. 2.
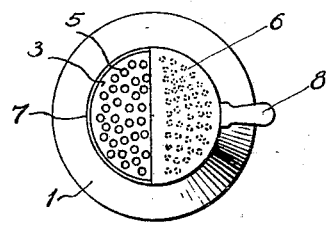
Fig. 3.
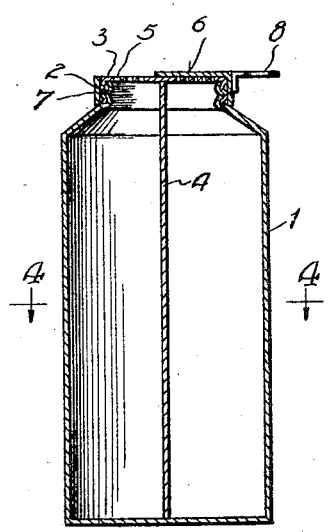
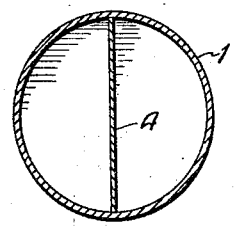
Fig. 4.
W. Stewart
INVENTOR
BY Victor J. Evans
ATTORNEY
WITNESS:

Patented Nov. 11, 1924.

1,514,740

UNITED STATES PATENT OFFICE.

WILLIS STEWART, OF CARLINVILLE, ILLINOIS.

CONDIMENT HOLDER.

Application filed August 25, 1922. Serial No. 584,354.

*To all whom it may concern:*

Be it known that I, WILLIS STEWART, a citizen of the United States, residing at Carlinville, in the county of Macoupin and State of Illinois, have invented new and useful Improvements in Condiment Holders, of which the following is a specification.

This invention relates to a condiment holder, the general object of the invention being to provide the holder with two chambers for holding two different kinds of material, such as salt and pepper.

Another object of the invention is to provide means for covering the holes in the cover of the salt compartment while the holes in the cover of the other compartment are exposed and vice versa.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.

Figure 2 is a top plan view thereof.

Figure 3 is a longitudinal sectional view.

Figure 4 is a section on line 4—4 of Figure 3.

Figure 5 is a view of the rotatable lid.

In these views 1 indicates the holder or shaker which is provided with a screw top 2 to receive the perforated cap 3. A partition 4 divides the holder into two chambers, one to receive salt and the other pepper, for instance. The perforations 5 in the cover 3 are so arranged that one-half of them will be located over one chamber and the other half over the other chamber. I also provide a rotatable lid 6 which is clamped to the cover 3 by its spring flange 7. This lid is of semi-circular form and of such dimensions as to cover the perforations of one-half of the cover while leaving the others exposed so that either the salt or pepper can be shaken from the holder. If desired the lid may be provided with a handle 8 for facilitating its rotation.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A holder of the class described comprising a receptacle, a partition therein dividing the same into two chambers, a perforated cover detachably connected with the top of the receptacle, a cap-shaped lid for the cover having a semi-circular opening in its top and its flange split to afford a pair of resilient arms which embrace the flange of the cover, the solid part of the lid covering one half the perforations in the cover while the other half are exposed and a handle on the lid for rotating the same.

2. The combination with a receptacle, a split resilient band engaging the neck of the receptacle and rotatably mounted thereon, and a semi-cylindrical valve element carried by the resilient flange and normally overlying the mouth of the bottle.

In testimony whereof I affix my signature.

WILLIS STEWART.